Patented Nov. 18, 1941

2,263,289

UNITED STATES PATENT OFFICE 2,263,289

NITROUREA-UREA-ALDEHYDE CONDENSATION PRODUCTS

Gaetano F. D'Alelio and Joe B. Holmes, Pittsfield, Mass., assignors to General Electric Company, a corporation of New York No Drawing. Application August 9, 1939, Serial No. 289,281

14 Claims. (Cl. 260—68)

This invention relates to new condensation products and to methods of making the same. The invention is concerned more particularly with self-curing aminoplasts, by which is meant heat-convertible resinous condensation products prepared from amino or amido compounds and having the inherent characteristic of curing under heat or under heat and pressure to the insoluble, infusible state without the addition of a curing accelerator or catalyst.

In the production of aminoplasts it has heretofore been common practice in converting such materials to the insoluble, infusible state to incorporate into the condensation product or into the molding composition a latent or an active (direct) curing catalyst. As pointed out more particularly hereafter, this technique and the final products have not been wholly satisfactory.

We have discovered that self-curing aminoplasts can be produced by condensing a non-nitrated urea, an aliphatic aldehyde, for example formaldehyde, and a nitrated urea, specifically nitrourea. The initial condensation may be carried out at normal or at elevated temperatures, in the presence or absence of a condensation catalyst and under alkaline, neutral or acid conditions.

The non-nitrated urea component may be, for instance, urea ($NH_2CONH_2$) itself; thiourea; iminourea (guanidine); aldehyde-reactable substituted ureas, thioureas and iminoureas such as methyl urea, acetyl urea, benzoyl urea, phenyl thiourea, asymmetrical diethyl urea, allyl urea, 2-chloro-allyl urea, ethylidene urea, methylol urea, methylene urea, dicyandiamide (cyano-iminourea), guanylurea, guanylthiourea, biguanidine, aminoguanidine, creatine (guanidine methyl glycine) and guanoline (guanido carbonic ethyl ester). The term "a non-nitrated urea," as used generally herein and in the appended claims, has reference to and means an aldehyde-reactable non-nitrated urea, numerous examples of which have been given above.

The nitrated ureas used in practicing this invention are those having at least one hydrogen atom attached to a nitrogen atom in the urea grouping. As a result, they are aldehyde reactable and for purpose of brevity are so termed hereafter. An example of an aldehyde-reactable nitrated urea is nitrourea, $NH_2CONHNO_2$. These nitrated ureas are not to be confused with urea nitrates, which are salts. An example of such a salt is urea nitrate, $NH_2CONH_2 \cdot HNO_3$.

Salts of aldehyde-reactable nitrated ureas, alone or mixed with aldehyde-reactable nitrated ureas, also may be used in carrying the present invention into effect. Such salts may be formed by treating an aldehyde-reactable nitrated urea with a basic substance. The basic substance may be of an organic or inorganic nature. Examples of basic substances which may be used in making salts of nitrated ureas are ammonia, potassium hydroxide, calcium hydroxide, methyl amine, trimethyl amine, ethanol amine, ethylene diamine, triethanol amine, etc. A more specific example of a salt of an aldehyde-reactable nitrated urea is the sodium salt of nitrourea, which may be produced by treating nitrourea with a solution of sodium hydroxide, thus:

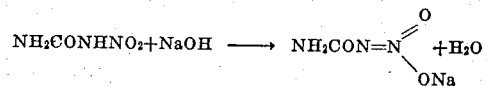

The term "nitrated urea" ("N-nitrated urea") as used generally hereafter is intended to include within its meaning nitrated ureas, salts of nitrated ureas, and mixtures thereof.

In producing the new condensation products, which may be described more specifically as co-condensation products, the choice of the aliphatic aldehyde component is dependent largely upon economic considerations and upon the particular properties desired in the finished product. We prefer to use as the aldehydic component formaldehyde or compounds engendering formaldehyde such as paraformaldehyde, hexamethylenetetramine, etc. For some applications we may use, for instance, acetaldehyde, propionaldehyde, butyraldehyde, acrolein, methacrolein, crotonaldehyde, etc., mixtures thereof, or mixtures of formaldehyde (or compounds engendering formaldehyde) with such aliphatic aldehydes. In general the longer the chain of the aliphatic aldehyde, the slower the cure of the resinous condensation product and the softer is the final product.

In the heat-convertible resinous condensation products of this invention the self-curing property of the product is imparted thereto by creating a resin molecule having this inherent characteristic. This is a discovery of great practical significance. It makes possible the production of molding compositions of uniform curing characteristics, which compositions yield molded articles free from imperfections, such as blisters, discolorations, etc. Such imperfections are due usually to localized curing that often occurs in resinous material of the admixed-catalyst type.

As the value of the molded article, especially light-colored articles, is materially influenced by its appearance, it is clear that the discovery of any means for decreasing or eliminating entirely the production of imperfect articles which must be scrapped or sold at reduced price is of considerable commercial importance.

As a result of our invention the difficulties attendant the production of molding compositions comprising aminoplasts of the admixed-catalyst type are avoided. With such compositions there was, despite the most careful precautions, considerable variation in the curing rates of the individual batches. This made difficult the maintenance of production schedules. Considerable variation also was common even among different portions of the same batch of material, as evidenced by the appearance of the cured article.

The resin syrups and molding compositions of this invention may be stored for long periods of time without material alteration. In marked contrast therewith the prior heat-convertible aminoplasts, more particularly those containing direct or active curing catalysts such as acids, for example hydrochloric, ethyl sulfuric, phthalic, chloroacetic, phosphoric, etc., lacked time or storage stability. This necessitated early use of the material after incorporating the catalyst.

Further, the molding compositions of this invention cure rapidly under heat or under heat and pressure and have good plastic flow during molding. Hence molded articles of even the most complicated designs can be produced rapidly and economically. The cured products have good light stability, excellent water resistance and surface finish and, in general, meet the strength, hardness and other requirements of the particular service application.

In carrying the present invention into effect the condensation reaction between the aliphatic aldehyde and the other components preferably is started under neutral or alkaline conditions. Neutral conditions may be established by neutralizing (if necessary) either the mixed components or the individual component or components prior to admixture. Any substance yielding an alkaline aqueous solution may be used in obtaining alkaline conditions for the initial condensation reaction. In some cases it may be desirable, in order more quickly to initiate reaction between the starting materials, to add a small amount of a suitable organic or inorganic acid. Thereafter the solution is treated to eliminate acidic conditions due to acid or acid salts. That is, the mass is neutralized or is made alkaline by adding an alkaline substance. The reaction is then caused to proceed further to produce the self-curing aminoplasts of this invention.

In obtaining the neutral, alkaline or acid conditions above described we may use, for example, ammonia, sodium hydroxide or carbonate, calcium hydroxide, methyl amine, diethyl amine, tri-isopropyl amine, ethanol amines, tri-isopropanol amine, etc., mixtures of such alkaline substances, inorganic or organic acids such as hydrochloric, sulfuric, phosphoric, acetic, acrylic, crotonic, malonic, etc., or acid salts such as sodium acid sulfate, monosodium phosphate, monosodium phthalate, etc., or mixtures of acids, of acid salts, or of acids and acid salts. Sodium hydroxide and carbonate and calcium hydroxide are examples of fixed alkalies (alkaline substances).

Various ways may be employed for effecting initial reaction between the components. For example, we may first mix all the reactants and effect condensation between the mixed reactants in the presence or absence of addition agents, as for instance, condensation catalysts, fillers, plasticizers, other natural or synthetic resinous bodies, solvents or diluents, etc. Alternatively, we may add the nitrated urea to a partial condensation product of a non-nitrated urea and an aliphatic aldehyde and effect further condensation between the components. Or, we may first condense the nitrated urea with aliphatic aldehyde, add the resulting product to a non-nitrated urea-aliphatic aldehyde partial condensation product and then cause the reaction to proceed further. Or, we may condense or partially condense the nitrated urea with a mol excess of an aliphatic aldehyde, add a non-nitrated urea to this condensation product and effect further reaction between the components. Still other ways may be employed in combining the components and in producing the unmodified or modified condensation products of this invention, as will be readily understood by those skilled in the art as the description of the invention proceeds.

In practicing this invention we may use a nitrated urea with a single non-nitrated urea and a single aldehyde in producing the self-curing aminoplasts. It was also surprisingly found that a salt of a nitrated urea, specifically alkali-metal salts of a nitrated urea, e. g., sodium nitrourea and potassium nitrourea, could be used with a nitrated urea, e. g., nitrourea, in carrying the present invention into effect. The rate of cure of resinous bodies produced in this way may be controlled by varying the ratio of the nitrated urea to the nitrated urea salt. This discovery has a great practical value in the manufacture of this particular self-curing aminoplast. By its application we may use a large ratio of nitrated urea to nitrated urea salt and obtain stable, yet fast curing resins. By decreasing the ratio of nitrated urea to nitrated urea salt, we are able to produce, under identical conditions as before, resins which are more readily controlled and of a slower cure. These condensation reactions may proceed under a wide variety of time, temperature and pressure conditions. The temperature of reaction may vary from room temperature to the reflux temperature of the reactants at reduced, atmospheric or superatmospheric pressures.

The products obtained as described above properly may be designated as intermediate condensation products. They are heat-convertible resinous bodies which alone or mixed with fillers, pigments, dyes, lubricants, plasticizers, etc., may be used, for example, as molding compositions. The modified or unmodified resinous masses are self-convertible under heat or under heat and pressure to the insoluble infusible state.

Depending upon the particular reactants employed and the particular conditions of reaction, these intermediate condensation products vary from clear, colorless, syrupy, water-soluble liquids to viscous, milky dispersions and gel-like masses of decreased solubility in ordinary solvents, such as alcohol, glycol, glycerine, water, etc. These liquid intermediate condensation products may be concentrated or diluted further by the removal or addition of volatile solvents to form liquid coating compositions of adjusted viscosity and concentration. The liquid compositions may be used, for instance, as surface coating materials, in the production of paints, varnishes, lacquers, enamels, etc., for general adhesive applications, as anti-creasing agents, in producing laminated articles, and for numerous other purposes. The liquid intermediate condensation products also may be used directly as casting resins. Those intermediate products of a gel-like nature may be dried and granulated to form clear, unfilled, heat-convertible resins.

In order that those skilled in the art better may understand how this invention may be carried into effect, the following examples are given by way of illustration:

Example 1

| | Parts by weight |
|---|---|
| Urea | 24.0 |
| Nitrourea | 0.018 |
| Aqueous formaldehyde (pH=7) (37.1% approximately) | 65.0 |
| Alpha flock | 24.0 |
| Water | 40.0 |

The above components were mixed and refluxed for 30 minutes. To the resulting mass was added 0.17 part zinc stearate and the compound dried at 50° C. Under heat and pressure this molding composition produced molded articles that were well cured and had good color. The compound could be dyed to obtain molded articles of delicate shades which are of especial commercial value.

Example 2

| | Parts by weight |
|---|---|
| Urea | 60.0 |
| Aqueous ammonia (28%) | 7.6 |
| Aqueous formaldehyde (37.1% approximately (approx. 60 parts HCHO) | 161.0 |
| Sodium hydroxide (in 15 parts of water) | 0.04 |
| Nitrourea | 0.5 |

The above components with the exception of the nitrourea were mixed and refluxed 20 to 30 minutes after which the above stated amount of nitrourea was added to the syrup. The syrup was not refluxed further. Sixty-one (61) parts alpha flock and 0.4 part zinc stearate were added to form a molding composition. The compound was heated to effect further condensation simultaneously with drying. Molded articles formed from this compound possessed good color, were well cured, and had excellent water resistance.

Example 3

| | Parts by weight |
|---|---|
| Urea | 60.0 |
| Aqueous ammonia (28%) | 7.6 |
| Aqueous formaldehyde (37.1% approximately) | 161.0 |
| Sodium hydroxide (in 15 parts of water) | 0.06 |
| Nitrourea | 1.0 |
| Sodium nitrourea | 2.25 |

All of the components except the nitrourea and sodium nitrourea were mixed and solution was effected by stirring. The nitrourea and sodium nitrourea in water solution were next added. The mass was heated under reflux for 10 minutes. The syrup was allowed to cool to room temperature. It was quite fluid and formed a good curing resin on the hot plate at 150° C. The syrup was mixed with 70 parts alpha flock and 0.4 part zinc stearate to form a molding composition. The compound was dried at 50° C. This compound when molded under heat and pressure gave excellent molded articles. The compound had good flow, and the molded articles had exceptional translucency.

Example 4

Same formulation as Example 3 but 1.5 parts sodium nitrourea were used. The components were mixed exactly as before and heated under reflux for exactly the same time. The syrup produced in this case formed a faster curing resin on the hot plate at 150° C. than did the syrup in Example 3. As the syrup cooled it became thicker and finally a gel formed. This gel was dried at 50° C. and molded under heat and pressure to form clear molded articles.

Example 5

| | Parts by weight |
|---|---|
| Urea | 60.0 |
| Aqueous ammonia (28%) | 7.6 |
| Aqueous formaldehyde (37.1% approximately) | 161.0 |
| Sodium hydroxide | 0.04 |
| Nitrourea | 0.5 |

The above components with the exception of the nitrourea were mixed and refluxed for 20 to 30 minutes. Then the nitrourea was added and the mass was heated under reflux for an additional 4 minutes. The resulting syrup yielded very fast curing resins on the hot plate at 150° C.

Example 6

| | Parts by weight |
|---|---|
| Urea | 36.0 |
| Nitrourea | 0.036 |
| Aqueous formaldehyde (37.1% approximately) | 121.0 |

The above components were mixed and heated under reflux for 30 minutes. The resulting syrup yielded a fast curing resin on the hot plate at 150° C. It was used for preparing molding compounds.

Condensation products of urea and formaldehyde alone, prepared as described under Examples 1 to 6, inclusive, but not inter-condensed with the specific nitrated urea mentioned in the individual example are heat-non-convertible. In other words, they will not cure under heat or under heat and pressure to the insoluble infusible state.

In certain cases, it may be advantageous to use a single nitrated urea with a plurality of non-nitrated ureas. Thus, to modify the characteristics of the molded product we may use a mixture of, for example, urea and dicyandiamide, with a single nitrated urea.

The ratio of the reactants to each other may be considerably varied but, in general, it is desirable to use at least one mol of an aliphatic aldehyde for each mol of mixed (total) non-nitrated urea and nitrated urea. In producing the heat-convertible resinous condensation products of this invention, the proportion of nitrated urea in all cases is at least sufficient to impart self-curing characteristics to the resin. Ordinarily not exceeding substantially ¼ mol nitrated urea is used for each mol of non-nitrated urea. No advantage accrues from using an amount of nitrated urea above the minimum required to secure the desired curing rate. Further, the use of high amounts of nitrated urea is undesirable for most molding applications because of the greater difficulty in obtaining molded articles of suitable flow and hardness, but may not be objectionable for other applications of the material.

From the foregoing it will be seen that the particular mol ratio of nitrated urea to the other components is dependent somewhat upon the inherent characteristics of the nitrated urea and the curing characteristics and other properties desired in the heat-convertible and heat-hardened resinous condensation products. Thus, in producing these new condensation products we may cause to react ingredients comprising essentially the following components: (1) a non-nitrated urea, (2) an aliphatic aldehyde and (3) a small molar amount not exceeding substantially one-fourth mol of an aldehyde-reactable N-nitrated urea or a salt thereof or a mixture of an aldehyde-reactable N-nitrated urea and a salt thereof, specifically nitrourea ($NH_2CONHNO_2$) or a salt thereof or a mixture of nitrourea and a salt thereof, said aliphatic aldehyde being present in the molar ratio of at least one mol aliphatic aldehyde for each mol of the non-nitrated urea of (1) plus the nitrated urea of (3). For example, we may produce a heat-curable (or heat-cured) resinous composition comprising a soluble, fusible (or insoluble, infusible) condensation product of ingredients comprising essentially the following components in the stated molar ratios: (1) one mol of a non-nitrated urea (specifically the organic compound corresponding to the formula $NH_2CONH_2$), (2) at least one mol (e. g., from 1½ to 2½ mols) of an aliphatic aldehyde, for instance formaldehyde, and (3) a small molar amount not exceeding substantially one-fourth mol of nitrourea or a salt thereof or a mixture of nitrourea and a salt thereof. For molding applications the ratio of the aliphatic aldehyde to urea substance may be considerably varied, but generally will be within the range of 1½ to 2½ mols aliphatic aldehyde for each mol of urea substance. No particular advantage ordinarily accrues from the use of higher amounts of aldehyde. Approximately 2 mols aliphatic aldehyde per mol urea substance usually gives very satisfactory results, particularly from the viewpoint of optimum yields of condensation product per unit cost.

The fundamental resins of this invention may be varied widely by introducing other modifying bodies before, during or after effecting condensation between the primary components. Thus, as modifying agents we may use, for example, monohydric alcohols such as ethyl, propyl, isopropyl, butyl, amyl, etc. alcohols; polyhydric alcohols such as ethylene glycol, diethylene glycol, glycerine, pentaerythritol, trimethylol nitro methane, etc.; monoamides such as formamide, acetamide, stearamide, acrylic acid amides (acryloamides), benzamide, toluene sulfonamide, etc.; polyamides such as adipic diamide, phthalamide and the like; amines such as ethylene diamine, aniline, phenylene diamine, amino phenols, etc.

The modifying bodies also may take the form of high molecular weight bodies with or without resinous characteristics, for example partially hydrolyzed wood products, lignin, proteins, protein-aldehyde condensation products, furfural condensation products, phenol-aldehyde condensation products, aniline-aldehyde condensation products, modified or unmodified, saturated or unsaturated polybasic acid-polyhydric alcohol condensation products, sulfonamide-aldehyde resins, water-soluble cellulose derivatives, natural gums and resins such as copal, shellac, rosin, etc.; polyvinyl compounds such as polyvinyl alcohol, polyvinyl acetate, polyvinyl acetals, specifically polyvinyl formal, synthetic linear condensation products such as the superpolyamides, etc.

Other modifying agents of a plasticizing or softening nature also may be incorporated with the condensation products of this invention. Examples of such modifying agents are the phthalate esters, for instance dimethyl phthalate, diethyl phthalate, dibutyl phthalate, etc., the phosphate esters such as tricresyl phosphate, triphenyl phosphates, etc.

Dyes, pigments and opacifiers (e. g., barium sulfate, zinc sulfide, titanium compounds such as the oxides, flaked aluminum, copper and the like) may be incorporated into the compositions to alter the visual appearance and the optical properties of the finished product. Mold lubricants such as the metallic soaps of the high molecular weight fatty acids, for example the stearates and palmitates of tin, zinc, etc., waxes such as carnauba, high melting point paraffin waxes, etc., may be added to facilitate molding of the compositions. Various fillers may be used to provide a wide variety of molding compositions. The choice of the filler depends upon the particular application for which the molded article is to be used. As fillers may be used, for instance, bleached or unbleached wood flour, alpha cellulose in flock form, sheets or cuttings of paper, cloth, canvas, etc., asbestos in powdered or long or short fiber length, powdered or flaked mica, wood chips, short or long wood fibers, synthetic or natural continuous threaded fibers, glass fibers in continuous filament or fabric (woven or felted) form, etc.

In the preparation of molding compositions from the resinous bodies of this invention, the non-dehydrated or the partially dehydrated resins may be compounded with the above addition agents in accordance with procedures well known to those skilled in the plastics art. The wet composition may be dried in the usual manner either at normal (room) temperature or at elevated temperatures in a preheated stream of air or under the influence of reflected heat energy. The dried compound may be densified through the usual processes of working in a Banbury mixer, or by rolling, pelleting or other means, followed by grinding and screening to the desired particle size. These molding compositions may be molded at elevated temperatures, preferably between 100° and 150° C., and at suitable pressures. The molding pressures generally range between about 1000 and about 4000 pounds per square inch, more particularly from about 2000 to 3000 pounds per square inch.

In addition to their use in molding compositions, the condensation products of this invention are especially suitable for use as fire retardants, water repellents and sizings when applied to wood or the like, or to fibrous materials such as silk, cotton, wool, synthetic organic fibers, etc., in continuous filament, thread, fabric or other form. It will be understood, of course that optimum resistance to water, fire, solvents, etc., is obtained only when the applied coating or sizing is converted to the insoluble infusible (cured) state. The cellulosic or other fibrous materials to be treated may be surface coated or both coated and impregnated by any suitable means, for example by spraying with, or immersing in, a solution of the treating agent and thereafter removing the solvent.

The modified or unmodified products of this invention have a wide variety of other uses, for instance in making buttons, clock cases, radio cabinets, dishes and other household utensils, decorative novelties and various other cast, molded and laminated articles of manufacture. They may be used in making arc-extinguishing tubes capable of evolving an arc-extinguishing gas under the heat of the arc, in the production of wire or baking enamels, and for bonding or cementing together mica flakes to form a laminated mica article. They also may be used in making laminated fibrous sheet materials wherein superposed layers of cloth, paper, etc., are firmly bonded together with the resin, as impregnants for electrical coils and other electrical devices, and for other purposes.

What we claim as new and desire to secure by Letters Patent of the United States is:

1. A composition of matter comprising the heat-hardenable condensation product of ingredients comprising essentially the following components: (1) a non-nitrated urea, (2) an aliphatic aldehyde and (3) a small molar amount not exceeding substantialy one-fourth mol of a nitrogenous compound selected from the class consisting of nitrourea, salts of nitrourea and mixtures of nitrourea and salts thereof, said aliphatic aldehyde being present in the molar ratio of at least one mol aliphatic aldehyde for each mol of the sum of the non-nitrated urea of (1) plus the nitrogenous compound of (3).

2. A composition of matter comprising an alcohol-modified, heat-hardenable condensation product of ingredients comprising essentially the following components: (1) a non-nitrated urea, (2) an aliphatic aldehyde and (3) a small molar amount not exceeding substantially one-fourth mol of nitrourea, said aliphatic aldehyde being present in the ratio of at least one mol aliphatic aldehyde for each mol of the sum of the non-nitrated urea of (1) plus the nitrourea of (3).

3. A heat-curable resinous condensation product of ingredients comprising essentially the following components: (1) a non-nitrated urea, (2) formaldehyde and (3) a small molar amount not exceeding substantially one-fourth mol of nitrourea, said formaldehyde being present in the molar ratio of at least one mol formaldehyde for each mol of the sum of the non-nitrated urea of (1) plus the nitrourea of (3).

4. A heat-curable resinous composition comprising a soluble, fusible condensation product of ingredients comprising essentially the following components in the stated molar ratios: (1) 1 mol of urea, (2) from 1½ to 2½ mols of formaldehyde and (3) a small amount not exceeding substantialy ¼ mol of nitrourea.

5. A product comprising the cured resinous condensation product of claim 3.

6. A condensation product of ingredients comprising essentially the following components: (1) a non-nitrated urea, (2) an aliphatic aldehyde and (3) a small molar amount not exceeding substantially one-fourth mol of a salt of nitrourea, said aliphatic aldehyde being present in the molar ratio of at least one mol aliphatic aldehyde for each mol of the sum of the non-nitrated urea of (1) plus the nitrourea salt of (3).

7. A heat-hardenable resinous composition comprising the heat-convertible reaction product of (1) the partial condensation product obtained by reaction, under alkaline conditions, of a mixture comprising urea and formaldehyde in the ratio of one mol of the former to from one and one-half to two and one-half mols of the latter and (2) nitrourea in a small molar amount not exceeding substantially one-fourth mol for each mol of the urea component of (1).

8. A heat-hardenable resinous composition comprising a soluble, fusible resinous condensation product of ingredients comprising essentially the following components in the stated molar ratios: (1) 1 mol urea, (2) at least 1 mol formaldehyde and (3) a small amount not exceeding substantially ¼ mol of a salt of nitrourea.

9. A heat-hardenable resinous composition comprising a soluble, fusible resinous condensation product of ingredients comprising essentially the following components in the stated molar ratios: (1) 1 mol urea, (2) at least 1 mol formaldehyde and (3) a small amount not exceeding substantially ¼ mol of a mixture of nitrourea and a salt of nitrourea.

10. The method of producing a heat-hardenable resinous composition which comprises reacting to resin formation ingredients comprising essentially the following components in the stated molar ratios: (1) 1 mol of a non-nitrated urea, (2) at least 1 mol of an aliphatic aldehyde and (3) a small amount not exceeding substantially ¼ mol of a nitrogenous compound selected from the class consisting of nitrourea, salts of nitrourea and mixtures of nitrourea and salts thereof.

11. A composition comprising the product of reaction of (1) the partial condensation product obtained by reaction, while admixed with an alkaline substance comprising ammonia, of urea and formaldehyde in the ratio of one mol of the former to from one and one-half to two and one-half mols of the latter and (2) nitrourea in a small molar amount not exceeding substantially one-fourth mol for each mol of the urea component of (1).

12. A composition comprising the product of reaction of (1) the partial condensation product obtained by reaction, in the presence of alkaline substances comprising ammonia and sodium hydroxide, of urea and formaldehyde in the ratio of one mol of the former to from one and one-half to two and one-half mols of the latter and (2) nitrourea and a salt of nitrourea in a small molar amount the sum of which does not exceed substantially one-fourth mol for each mol of the urea component of (1).

13. The method which comprises effecting partial reaction, under alkaline conditions, between ingredients comprising essentially urea and formaldehyde in the ratio of one mol of the former to at least one mol of the latter, adding to the resulting partial condensation product a nitrogenous compound selected from the class consisting of nitrourea, salts of nitrourea and mixtures of nitrourea and salts thereof in a small molar amount not exceeding substantially one-fourth mol for each mol of the urea component of the said urea-formaldehyde partial condensation product, and causing the said nitrogenous compound to intercondense with the said partial condensation product.

14. The method which comprises effecting partial reaction, under alkaline conditions due to the presence between both ammonia and sodium hydroxide, of urea and formaldehyde in the ratio of one mol of the former to from one and one-half to two and one-half mols of the latter, adding to the resulting partial condensation product nitrourea in a small molar amount not exceeding substantially one-fourth mol for each mol of the urea component of the said urea-formaldehyde partial condensation product, and causing the said nitrourea to intercondense with the said partial condensation product.

GAETANO F. D'ALELIO.
JOE B. HOLMES.

CERTIFICATE OF CORRECTION.

Patent No. 2,263,289.   November 18, 1941.

GAETANO F. D'ALELIO, ET AL.

It is hereby certified that error appears in the printed specification of the above numbered patent requiring correction as follows: Page 5, first column, line 17, claim 1, for "substantialy" read --substantially--; and second column, line 63, claim 14, for "between" read --of--; line 64, claim 14, for "of" read --between--; and that the said Letters Patent should be read with this correction therein that the same may conform to the record of the case in the Patent Office.

Signed and sealed this 6th day of January, A. D. 1942.

(Seal)

Henry Van Arsdale,
Acting Commissioner of Patents.